(12) United States Patent
Orgeron (10) Patent No.: US 9,051,007 B2
(45) Date of Patent: Jun. 9, 2015

(54) MECHANICALLY STEERED ARTICULATING DOLLY TRANSPORT SYSTEM

(71) Applicant: Keith J. Orgeron, Spring, TX (US)

(72) Inventor: Keith J. Orgeron, Spring, TX (US)

(73) Assignee: T&T Engineering Services, Inc., Tomball, TX (US)

( * ) Notice: Subject to any disclaimer, the term of this patent is extended or adjusted under 35 U.S.C. 154(b) by 0 days.

(21) Appl. No.: 13/852,728

(22) Filed: Mar. 28, 2013

(65) Prior Publication Data

US 2013/0257016 A1  Oct. 3, 2013

Related U.S. Application Data

(60) Provisional application No. 61/618,625, filed on Mar. 30, 2012.

(51) Int. Cl.
*B62D 53/06* (2006.01)
*B62D 12/00* (2006.01)
*B62D 13/00* (2006.01)
*B62D 13/02* (2006.01)

(52) U.S. Cl.
CPC .............. *B62D 12/00* (2013.01); *B62D 13/00* (2013.01); *B62D 13/025* (2013.01)

(58) Field of Classification Search
CPC .................................. B60P 3/40; B62D 13/025
USPC ............. 280/404, 411.1, 81.1, 426, 442, 419
See application file for complete search history.

(56) References Cited

U.S. PATENT DOCUMENTS

| | | |
|---|---|---|
| 2,110,213 A | 3/1938 | Flowers |
| 2,167,943 A | 8/1939 | Fox |
| 2,502,946 A | 4/1950 | Hart |
| 2,793,052 A | 5/1957 | Googe |
| 2,968,495 A | 1/1961 | Hutchens |
| 3,048,422 A | 8/1962 | Payne et al. |
| 3,087,744 A | 4/1963 | Tanenbaum |
| 3,212,793 A | 10/1965 | Pietroroia |
| 3,403,925 A | 10/1968 | Sauer |
| 3,542,390 A | 11/1970 | Fikse |

(Continued)

FOREIGN PATENT DOCUMENTS

WO           98/10973  A1      3/1998

*Primary Examiner* — Anne Marie Boehler
*Assistant Examiner* — Marlon Arce
(74) *Attorney, Agent, or Firm* — John G. Fischer, Esq.; Jaspal S. Hare, Esq.; Scheef & Stone, L.L.P.

(57) ABSTRACT

The present invention relates to a mechanically steered articulating dolly transport system for transporting large structures such as a drilling mast over the federal highway system. Generally, the invention relates to an articulating dolly system that utilizes a unique mechanical system for steering a first dolly with a path generated by the movement of the load held by the second dolly. More particularly, the invention provides a front dolly steered by a non-rotatable front steering frame, a rear dolly having a pivotally mounted turntable and a pair of steering links connected between the respective sides of the front steering frame and the turntable. The left steering link and the right steering link are located in a first plane. One or both of the turntable and the steering frame being located on a second plane that is not the first plane. Moment forces generated between plane one and plane two elastically deform one or both of the steering frame and the turntable to permit the transport system to make a left-hand or right-hand turn.

19 Claims, 10 Drawing Sheets

(56) References Cited

U.S. PATENT DOCUMENTS

| | | | |
|---|---|---|---|
| 3,721,358 A | 3/1973 | Brock | |
| 3,873,129 A * | 3/1975 | Schmidt | 280/404 |
| 4,010,816 A | 3/1977 | Powell | |
| 4,117,905 A | 10/1978 | Mustered | |
| 4,117,906 A | 10/1978 | Mustered | |
| 4,208,063 A | 6/1980 | Baker et al. | |
| 4,286,798 A | 9/1981 | Butler et al. | |
| 4,383,698 A | 5/1983 | Felburn | |
| 4,441,730 A | 4/1984 | Damm | |
| 4,451,058 A | 5/1984 | Curry | |
| 4,494,766 A | 1/1985 | McHugh et al. | |
| 4,603,873 A | 8/1986 | Perlini | |
| 4,702,488 A * | 10/1987 | Baillie | 280/426 |
| 4,735,432 A | 4/1988 | Brown | |
| 4,740,006 A | 4/1988 | Ducote | |
| 4,768,802 A | 9/1988 | Winkler | |
| 4,802,545 A | 2/1989 | Nystuen et al. | |
| 4,982,976 A | 1/1991 | Kramer | |
| 5,035,439 A | 7/1991 | Petrillo | |
| 5,110,149 A | 5/1992 | Dahlstrom | |
| 5,201,836 A | 4/1993 | DeWitt | |
| 5,234,069 A | 8/1993 | Krone et al. | |
| 5,364,116 A | 11/1994 | Houle et al. | |
| 5,366,337 A | 11/1994 | Eriksson | |
| 5,370,414 A * | 12/1994 | Tucker | 280/404 |
| 5,479,999 A | 1/1996 | Proia | |
| 5,700,023 A | 12/1997 | Picard | |
| 6,131,691 A | 10/2000 | Morch | |
| 6,152,475 A | 11/2000 | Poole | |
| 6,257,611 B1 | 7/2001 | Muldoon | |
| 6,932,173 B2 | 8/2005 | Henderson | |
| 7,086,660 B2 | 8/2006 | Bruening et al. | |
| 7,225,891 B2 | 6/2007 | Gehring et al. | |
| 7,412,315 B2 | 8/2008 | Wildey et al. | |
| 7,637,512 B1 | 12/2009 | McGhie et al. | |
| 7,686,320 B1 | 3/2010 | McGhie et al. | |
| 7,694,993 B2 | 4/2010 | Timmons, Jr. | |
| 2011/0266774 A1 | 11/2011 | Gregg | |

* cited by examiner

MECHANICALLY STEERED ARTICULATING DOLLY TRANSPORT SYSTEM

TECHNICAL FIELD OF INVENTION

The present invention relates to a mechanically steered articulating dolly transport system for transporting large structures such as a drilling mast over the federal highway system. Generally, the invention relates to an articulating dolly system that utilizes a unique mechanical system for automatically steering a first dolly with a path generated by the movement of the load held by the second dolly. More particularly, the invention provides a mechanical steering system having an isosceles trapezoidal steering system that incorporates deformation of the steering system components. The system mechanically steers itself around relatively tight curves without the assistance of an electrical or hydraulic control system. The system has finite alignment adjustability, a minimized weight, and relies on manual hydraulic steering controls only for loading/unloading or parking maneuvers. Additionally, although two steering links share the invention's steering loads to form a symmetric assembly, either link alone could maintain the steering control should the other fail, providing high reliability and thus safety.

BACKGROUND OF THE INVENTION

It is a common requirement in several industries to transport very long and heavy structures across the federal and state highways. As a particular example of such requirement, in the exploration of oil, gas and geothermal energy, drilling operations are used to create boreholes, or wells, in the earth. Drilling rigs used in subterranean exploration must be transported to the locations where drilling activity is to be commenced. These locations are often remotely located and in rough terrain. The transportation of such rigs on state highways requires compliance with highway safety laws and clearance underneath bridges or inside tunnels. Once transported to the desired location, large rig components must each be moved from a transport trailer into engagement with the other components located on the drilling pad.

Moving a full-size rig requires disassembly of the mast into two or three sections which must then be transported. The mast sections are then loaded between a tractor trailer and a dolly system designed to follow the tractor trailer. The dolly systems must follow the tractor in a precise manner or the load will become unstable and dangerous. Safety is a paramount issue. Consistent with the safety issue and the high cost of downtime during transportation is reliability of the system. Breakdowns can be both dangerous and costly if the drilling rig is unavailable. It is also critical to transport the mast sections (or other structural loads) without imparting undue stress on their structures such that the structural strength of the mast is not compromised.

It is also necessary that the transport be simple, have a relatively small turning radius and not require significant programming or balancing of the loads prior to transport. It is also necessary that the system accurately steer the load, such that undesirable wear on the dolly tires and fuel inefficiency can be avoided. It is also desirable that the system requires minimum maintenance and relies on a minimum of hydraulic and electronic functionality.

For example, U.S. Pat. No. 2,167,943 to Fox discloses steering mechanisms for vehicles and more particularly to steering mechanisms between towing and towed vehicles, by which the wheels of the towed vehicle are caused to "track" or follow the paths of the wheels of the towing vehicle in making turns. Fox, however, uses hydraulic components, rather than a simple to implement mechanical linkage steering system, and does not provide for direct control of the dolly with redundant links. As a result, the apparatus of Fox requires more components at the cost of increased weight and complexity. Due to the inclusion of hydraulic assemblies, the apparatus of Fox is less reliable and would require additional maintenance to operate, driving up overall costs for the device.

U.S. Pat. No. 3,403,925 to Sauer discloses a self-centering axle for a vehicle with at least one fixed single or multiple axle, and an oscillatable mobile assembly which includes a wheeled axle for supporting the same and is adapted for attachment to highway-drawn load-carrying vehicles including a chassis adapted to support the load. The apparatus of Sauer does not use simple to implement mechanical steering linkages, but instead relies upon a complex assembly of raceways, clips, arms, and shafts to facilitate steering of the axles. As a result, the apparatus of Sauer may be less reliable and more prone to breakdown as opposed to a simple mechanical linkage steering system. Thus, the apparatus of Sauer suffers from increased costs and reliability issues over a mechanical steering system.

U.S. Pat. No. 3,542,390 to Fikse discloses a tractor and trailer combination, and more particularly to a trailer including a forward and a rear set of opposed lateral support wheels which swivel to facilitate the trailer making a turn with the rear wheels following the arc of the turn. Fikse further discloses a trailer construction with a steerable forward set and a steerable rear set of opposed lateral support wheels or dollies supported upon swivel means. However, the apparatus of Fikse does not provide controllable steering; rather, it relies on interconnected swivels on the rear dollies to facilitate steering of the trailer. The swivel steering system of Fiske provides a less accurate and less stable method for steering as opposed to a mechanical linkage steering system.

U.S. Pat. No. 4,117,905 to Mustered discloses a hydraulic articulated steering system with an equivalent total hydraulic steering system for back-up, emergencies, and for supplementary additional steering power, and without dependence upon additional mechanical linkages. Specifically, Mustered discloses a steering system comprised of steering actuation means and two or more hydraulic telescoping steering means, each of which is positioned proximate to the pivot attachment point of the articulated vehicle with at least one of the two or more hydraulic steering means positioned on a first side of this pivot attachment point and another of the hydraulic telescoping steering means positioned on the first or second side of the pivot attachment. The dual metering control means of Mustered is more complex than a simple mechanical steering linkage, and as a result may provide less reliable steering operation over time. Because Mustered relies upon a hydraulic steering system, it does not provide for direct control of the dolly with redundant mechanical links. Thus, the apparatus of Mustered provides less accurate steering as well as increased weight and complexity over a mechanical linkage steering system. Furthermore, cost and reliability of the steering device is adversely affected.

U.S. Pat. No. 4,441,730 to Damm discloses a steering device for a multi-axled goose-neck trailer coupled with a vehicle in front of the trailer, the steering device comprising wheels pivotable about a main axle and connected to stay rods for forcibly steering the rear wheel set through hydraulics in a direction opposite to the steering wheels of the tracking vehicle, so that the trailer more closely follows the track of the tracking vehicle. The apparatus disclosed in Damm would thus put substantial strain and wear on the rear wheels. Further, the use of hydraulic cylinders in Damm for forcibly steering of the rear wheels may lead to faster deterioration of the steering assembly and hydraulics in addition to the increased wear on the wheels. The use of hydraulics further increases the overall weight and costs of the steering system, and also adversely affects reliability of the system.

U.S. Pat. No. 5,035,439 to Petrillo discloses a tractor trailer or other vehicle that is equipped with an auxiliary rear steering arrangement which is steered via pneumatic-type suspensions and hydraulic cylinders as well as adjusting the weight of the trailer and load to facilitate steering. The apparatus of Petrillo requires an operator, and is generally directed more towards a more efficient method of weight distribution for the load. In this regard, the apparatus taught by Petrillo provides for a less accurate steering system as opposed to a direct mechanical linkage steering system, and has added drawbacks of increased weight and potential reliability problems due to the use of hydraulics and pneumatics.

U.S. Pat. No. 5,234,069 to Krone et al. discloses a steering control system in which one pair of wheels of an articulated steering vehicle are steered in synchronization with the articulation steering and controlled via a pump and valve means for directing fluid to hydraulic cylinders, which are locked in place. The hydraulic steering system of Krone is therefore more complex and prone to failure than a simple mechanical linkage steering system. The hydraulic steering system of Krone further suffers from added weight of the hydraulic assemblies and increased costs as a result.

U.S. Pat. No. 5,479,999 to Proia discloses an automatic powered, self-tracking system with powered controls for the rear axles of large vehicles, along with the use of motion detectors to sense the direction and degree of vehicle turning, and are connected to a plurality of either hydraulic or pneumatic axle-pivoting mechanisms which exert a force on preselected components of a vehicle's suspension system. As a result, the steering apparatus taught in Proia is highly dependent upon use of motion detectors, and the failure of any one of the motion sensors would have a substantially adverse impact on the accuracy of the system. In addition, the use of hydraulics and pneumatics on the apparatus of Proia induces increased weight and costs on the system, drawbacks that are not present in a simple mechanical linkage steering system.

U.S. Pat. No. 5,700,023 to Picard discloses an articulated vehicle composed of a series of modules interconnected by a composite articulated connection comprising at least one elastic articulation with controlled movement. Picard further discloses a vehicle articulated in a simple mechanical fashion, making it possible to ensure better relative maintenance in position of the modules of which it is composed near-perfect following of the curves and irregularities in the roadway, and a substantial limitation of extraneous movements of the modules relative to each other, even for road trains composed of two or more modules. While Picard discloses a method of mechanical self-tracking, its steering system is unable to achieve precise articulation for precise steering and navigation of the dolly.

U.S. Pat. No. 6,152,475 to Poole discloses a converter dolly that replaces the rear wheels of a truck trailer to provide the trailer with a steering ability about its rear wheels, and is controlled by the driver of the tractor through a control system mounted in the tractor cab. The converter dolly is modified to include a hydraulic actuating system, including a piston, cylinder, and pump assembly, which act upon the tongue of the converter dolly to pivot the converter dolly about a king pin. Thus, Poole suffers several deficiencies from the use of hydraulics, such as increased costs associated with the hydraulics as well as increased weight of the hydraulic assemblies. Additionally, the increased complexity of the steering system disclosed in Poole renders it more prone to reliability issues and failures and further requires that the driver of the tractor manually operate the dolly steering system.

U.S. Pat. No. 7,412,315 to Wildey et al. discloses a steering system for an articulated vehicle that has a microprocessor connected to a proportional solenoid valve which controls the direction, amount and rate of flow of hydraulic fluid to and from hydraulic articulation cylinders, which provide articulation between the frames of the articulated vehicle. Wildey also features a positional feedback sensor to measure the angle of articulation between the frames and communicates the angle of articulation to the processor. In Wildey, the use of solenoids in combination with hydraulics for control and articulation of the steering assembly leaves it more prone to failure over more reliable mechanical linkage steering systems and does not allow for direct control of the dolly. Thus, the steering system of Wildey provides less accurate steering as well as increased weight and complexity over a mechanical linkage steering system.

U.S. Pat. No. 7,637,512 to McGhie et al. discloses a boom support vehicle which reduces tire scuffing, reduces structural size, and provides improved turning characteristics. McGhie includes a self-steering castor axle as the front axle of the boom support vehicle front dolly, similar to the castor axle of some three axle semi-trailers, a two member articulated boom support vehicle design which has an articulation point (steering pivot) near the rear of the vehicle. While the dolly steering system disclosed in McGhie is separate from the tractor, it fails to disclose an automatic steering system, but rather relies upon the turning forces on the front axles to facilitate the steering and characteristics upon the back axles. Further, the apparatus of McGhie contains conventional rear axles which are not steerable and merely follow the tracking provided by the front axles.

Thus, there remains a need for improvements for the creation of a safe and reliable dolly system for transporting large structural loads on the federal and state highway systems. In particular, it is desirable to transport large loads on a mechanically steered articulating dolly system having a relatively small turning radius.

It is further desirable to have a dolly device that is relatively inexpensive to produce and implement, as well as inexpensive to maintain with a high degree of reliability. It is also desirable that such a dolly device would also be relatively lightweight in order to reduce consumption of fuel during transport of the dolly and payload.

In summary, the preferred embodiments of the present invention provide a unique solution to the engineering constraints and environmental challenges of providing a durable mechanically actuated steering system.

SUMMARY OF THE INVENTION

The present invention provides a substantially improved transport system for relocation of a large structure such as a mast section for a drilling rig. In one embodiment, a transport dolly is provided, comprising a front dolly, a rear dolly, and a steering mechanism linking the relative angularity between the front and rear dollies.

In one embodiment, the front dolly has at least one axle and the rear dolly has at least two axles. The steering mechanism comprises a steering frame non-rotatably connected to the front dolly, a turntable pivotally mounted to the rear dolly, a left steering link pivotally connected between the steering frame and the turntable, and a right steering link pivotally connected between the steering frame and the turntable. The distance between the connections of the left steering link and the right steering link to the turntable are greater than the distance between connections of the left steering link and the right steering link to the steering frame.

In another embodiment, one or both of the steering frame and turntable elastically deforms to permit the transport system to make a left-hand or right-hand turn. In one embodiment, one or both of the left and right steering links elastically deforms to permit the transport system to make a left-hand or right-hand turn.

In one embodiment, the left steering link and the right steering link are located in a first plane, and one or both of the turntable and the steering frame are located on a second plane that is not the first plane. Moment forces generated between the first plane and the second plane elastically deform one or both of the steering frame and turntable to permit the transport system to make a left-hand or right-hand turn.

In one embodiment, the left steering link is nonparallel in relationship to the right steering link. The left steering link, the right steering link, the turntable, and the steering frame form an isosceles trapezoid when the transport system is traveling in a straight line. In this embodiment, the turntable and the steering frame form the parallel bases of the isosceles trapezoid.

In another embodiment, the front dolly has a front platform and two axles connected to the front platform. A front thrust bearing is located on top of the front platform.

The rear dolly has a rear platform. A rear thrust bearing is located on top of the rear platform. The rear dolly has a rearward portion located behind the rear platform with three axles connected to the rearward portion. The rear dolly has a forward portion located forward of the rear platform. A cylindrical opening is located on the forward portion.

The steering mechanism has a torque tube extending through the cylindrical opening on the forward portion of the rear dolly. The torque tube is mechanically locked to the front dolly, such as by an engaging key and keyway or other mechanism to provide coincident rotation between the torque tube and the front dolly. A steering frame is mounted to the torque tube. A turntable is pivotally mounted to the rear platform. A load cradle is connectable to the top side of the turntable. A left steering link is pivotally connected between the steering frame and the turntable. A right steering link is pivotally connected between the steering frame and the turntable.

A structure to be transported is connectable to a tractor. The structure is mounted onto the load cradle of the transport system located behind the tractor. The tractor pulls the structure, the structure pulls the rear dolly, and the rear dolly pushes the front dolly.

Changing the path of the tractor rotates the structure to follow the tractor. Rotation of the structure rotates the turntable in relation to the rear dolly. Rotation of the turntable compresses one of the right or left steering links and tensions the other so as to urge the steering frame to rotate the front dolly towards the new direction of the tractor.

In another embodiment, the left steering link and right steering link have a compressible and/or expandable component to allow small adjustments to the length of the steering links when sufficient force is imparted due to steered turning of the transport system.

In another embodiment, the left and right steering links are pivotally connected between the steering frame and the turntable with eccentric connectors that are rotatable to impart small adjustments to the distance between the steering frame and the rear turntable on each of the left and right sides when sufficient force is imparted due to steered turning of the transport system.

In another embodiment, the transport system has a left side and a right side in relationship to a forward direction of travel. The steering frame has a top and an opposite bottom facing the front platform. A flexible left steering bracket is attached to the bottom-left side of the steering frame. A flexible right steering bracket is attached to the bottom-right side of the steering frame.

The turntable also has a top and an opposite bottom facing the rear platform. A flexible left turntable bracket is attached to the bottom-left side of the turntable. A flexible right turntable bracket is attached to the bottom-right side of the turntable. The left steering link is pivotally connected at one end to the left steering bracket, and pivotally connected at its opposite end to the left turntable bracket. The right steering link is pivotally connected at one end to the right steering bracket, and pivotally connected at its opposite end to the right turntable bracket.

In another embodiment, a front thrust bearing assembly is located between the front platform and the forward portion of the rear dolly.

In another embodiment, the front thrust bearing assembly has a hollow interior. The torque tube is positioned in non-rotatable relation, such as by welding, inside the hollow interior of the front thrust bearing assembly.

In another embodiment, the torque tube has a hollow interior, and a base plate is located inside the hollow interior of the torque tube.

In another embodiment, a rear thrust bearing assembly is located between the rear platform and the turntable.

In another embodiment, an override is provided for aligning and parking the system. In this embodiment, a front dolly cylinder bracket is located on the front dolly, forward of the thrust bearing. A rear dolly cylinder bracket is located on the forward portion of the rear dolly, forward of the torque tube. An actuator is pivotally connected between the front dolly cylinder bracket of the front dolly and the rear dolly cylinder bracket of the rear dolly.

In another embodiment, the actuator is a hydraulic cylinder. A tank is provided that has sufficient capacity to retain the majority of the hydraulic cylinder fluid when the cylinder is unpowered during normal driving conditions.

As will be understood by one of ordinary skill in the art, the system disclosed may be modified somewhat and the same advantageous result obtained. For example, the number of axles may be varied without departing from the teachings and spirit of the present invention.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
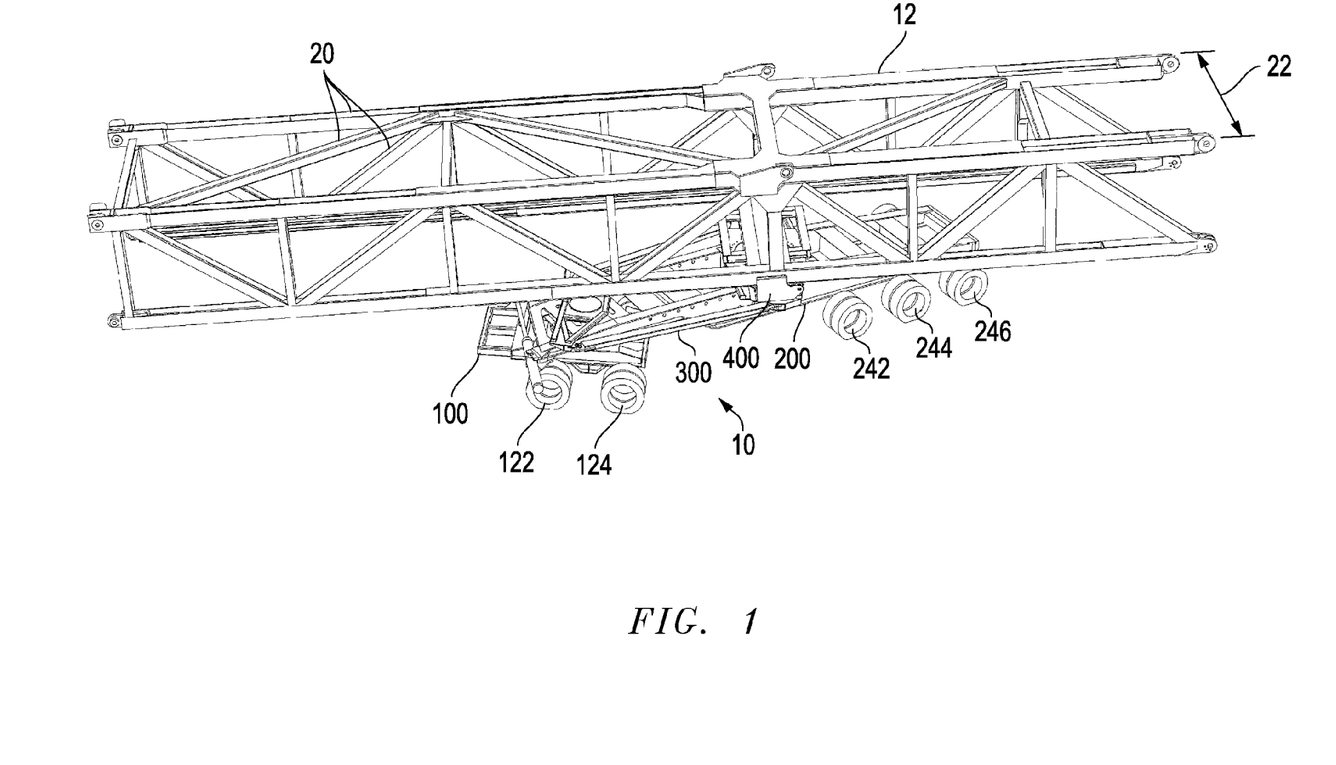
FIG. 1 is an isometric view of the mechanically steered transport system having features of the present invention, illustrated in a 5-axle embodiment, carrying a mast section of a drilling rig.

FIG. 1 is an isometric view of a mechanically steered transport system 10 having features of the present invention, and illustrated in a 5 axle embodiment. As illustrated in FIG. 1, transport system 10 is transporting a large structure 12. In this illustration, structure 12 is a mast of a drilling rig. In the example shown, structure 12 is comprised of a framework 20 that defines a maximum transport width 22.

Transport system 10 is comprised generally of a front dolly 100, a rear dolly 200, and a steering system 300. Structure 12 is supported on one end by a load cradle 42 of a tractor 40. Behind tractor 40, structure 12 is separately supported by a load cradle 400 mounted on rear dolly 200. Transport system 10 is designed to be pulled by structure 12, through its connection to tractor 40 (see FIGS. 9-10).

Transport system 10 has axles disposed beneath front dolly 100 and rear dolly 200. In embodiments having an odd number of axles, a number of significant complications related to mechanical steering are present. In the embodiment illustrated, front dolly 100 has a front platform 120, and a first axle 122 and a second axle 124. Rear dolly 200 has a third axle 242, a fourth axle 244, and a fifth axle 246 connected to rearward portion 240.

Figure 2:
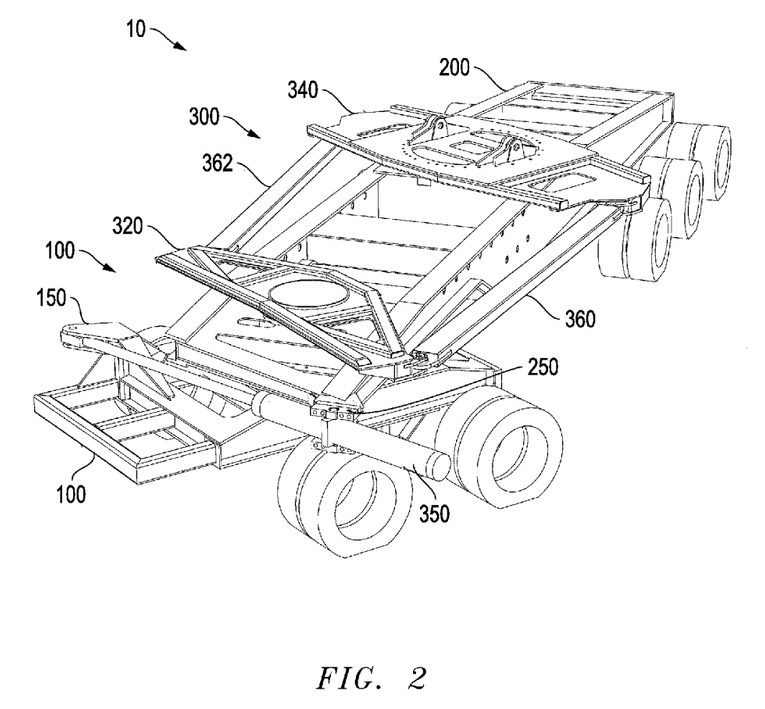
FIG. 2 is an isometric view of the mechanically steered transport system having features of the present invention.

FIG. 2 is an isometric view of transport system 10, having features of the present invention illustrated from a viewpoint slightly above transport system 10. As seen in FIG. 2, steering system 300 generally comprises a steering frame 320, a turntable 340, a left steering link 360, and a right steering link 362. Turntable 340 is pivotally attached to rear dolly 200, while steering frame 320 is connected to front dolly 100 in non-rotating relation.

In an optional embodiment also illustrated in FIG. 2, a manually operable override comprising a front cylinder bracket 150 is connected to front dolly 100, and a rear cylinder bracket 250 is connected to rear dolly 200. An actuator 350 is pivotally connected between front cylinder bracket 150 and rear cylinder bracket 250. Actuator 350 may be a hydraulic cylinder that is permitted to free float during normal driving conditions. Actuator 350 may be engaged for overriding the mechanical steering capability of transport system 10 when reversing the system, or when operating in small spaces, like parking lots or drilling rig sites.

Figure 3:
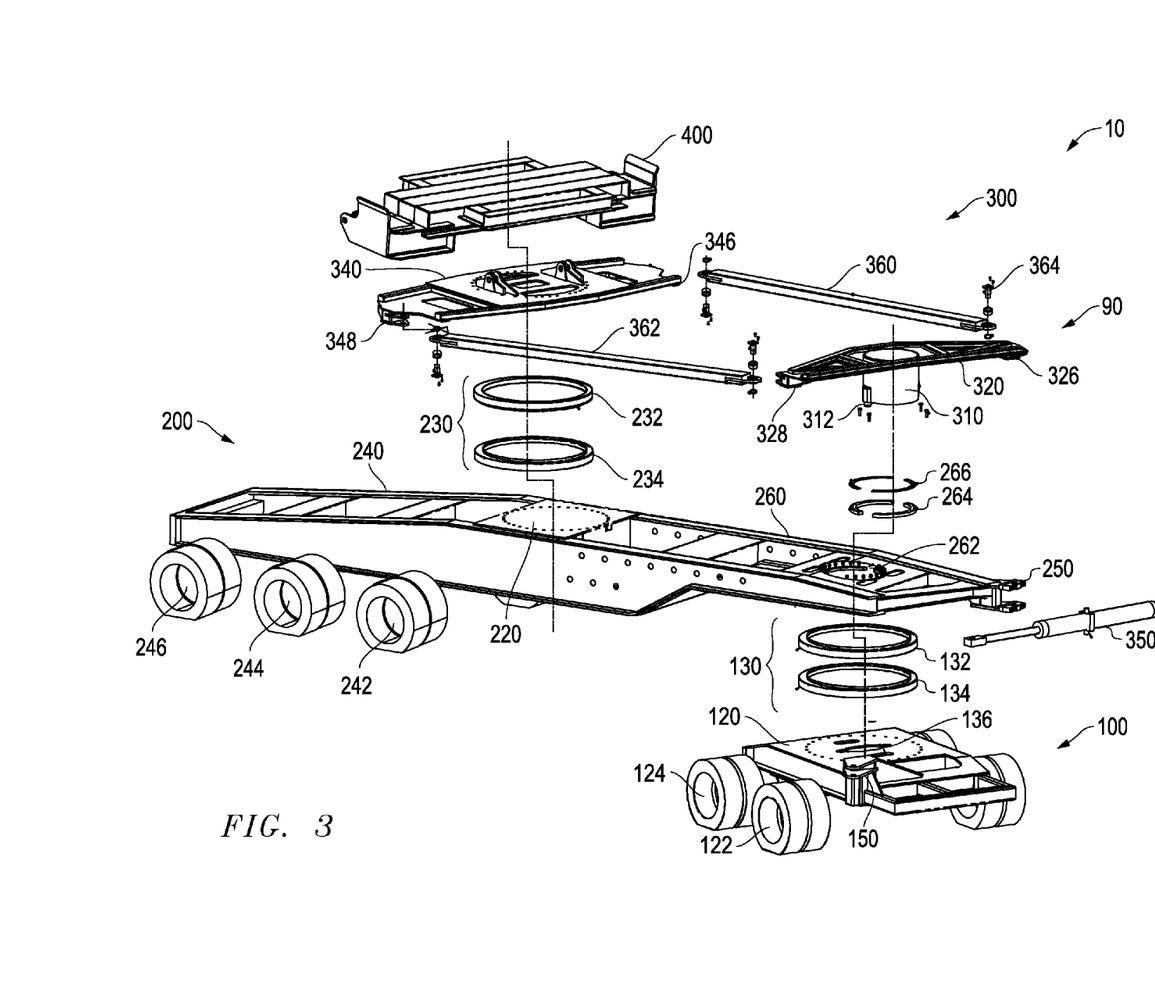
FIG. 3 is an exploded isometric view of the entire steering system, having features of the present invention illustrated from a viewpoint slightly above the mechanism.

FIG. 3 is an exploded isometric view of transport system 10, having features of the present invention illustrated from a viewpoint slightly above transport system 10. Front dolly 100 has a front platform 120, and a first axle 122 and a second axle 124. A front thrust bearing assembly 130 is located on front platform 120. Front thrust bearing assembly 130 may be comprised of an upper front bearing 132 and a lower front bearing 134. In one embodiment, a rotation lock mechanism, such as a keyway 136, is provided on front platform 120. As indicated above, a front cylinder bracket 150 may also be provided for pivotal connection to actuator 350. The preferred location of front cylinder bracket 150 is forward of front platform 120.

Rear dolly 200 generally has a rear platform 220, a rearward portion 240 rearward of rear platform 220, and a forward portion 260 forward of rear platform 220. A rear thrust bearing assembly 230 is located on rear platform 220. Rear thrust bearing 230 may be comprised of an upper rear bearing 232 and a lower rear bearing 234. In this embodiment, upper rear bearing 232 is connected to a bottom side of turntable 340, and lower rear bearing 234 is connected to rear platform 220 such that turntable 340 is mounted in rotatable relation to rear dolly 200. Rear dolly 200 has a third axle 242, a fourth axle 244, and a fifth axle 246 connected to rearward portion 240.

Forward portion 260 of rear dolly 200 connects to front dolly 100. Forward portion 260 has a cylindrical opening 262. In one embodiment, a bearing pad 264 is held in place in cylindrical opening 262 by a bolting ring 266 for engagement with steering system 300.

In another embodiment, upper front thrust bearing 132 is connected to the bottom of frontward portion 260 for engagement with lower front thrust bearing 134, which is connected to front platform 120. Engagement of upper front thrust bearing 132 with lower front thrust bearing 134 provides a weight bearing pivotal connection between front dolly 100 and rear dolly 200.

As indicated above, a rear cylinder bracket 250 may also be provided for pivotal connection to actuator 350. The preferred location of rear cylinder bracket 250 is forward of cylindrical opening 262.

Figure 4:
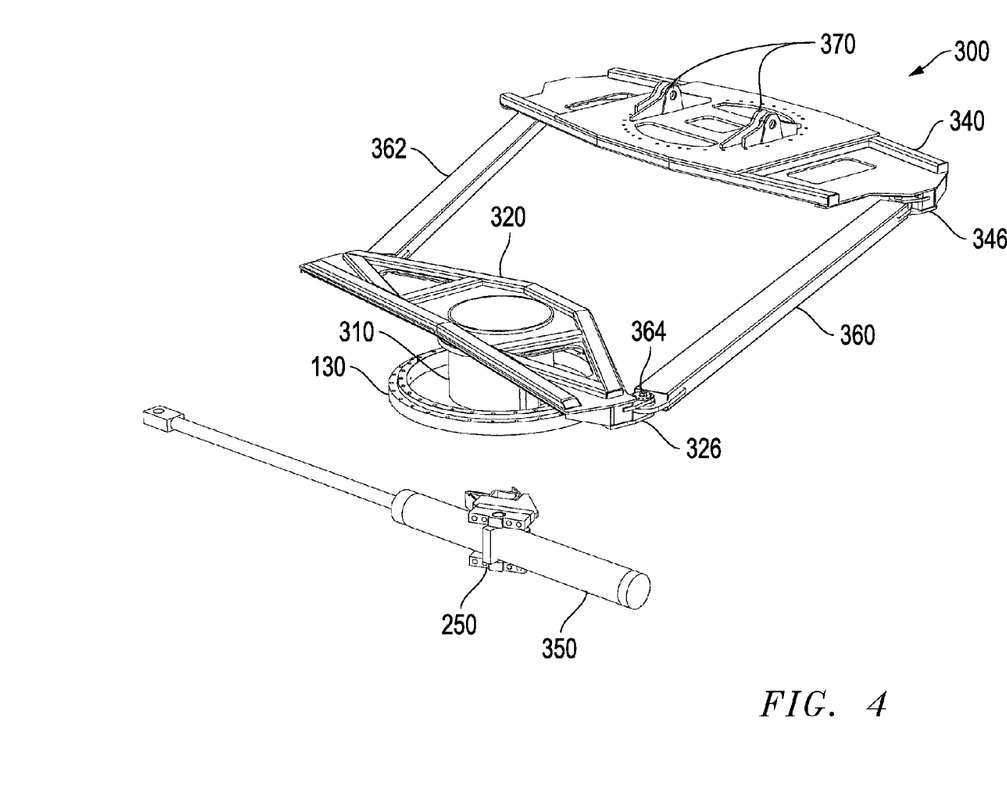
FIG. 4 is an isometric view of mechanically steered transport system 10, illustrating steering assembly 300 substantially assembled, and also illustrating in contrast a hydraulic override system that may be used for aligned parking of the system if necessary.

FIG. 4 is an isometric view of transport system 10, illustrating steering assembly 300 substantially assembled. As seen in FIG. 4, steering system 300 generally comprises a steering frame 320, a turntable 340, a left steering link 360, and a right steering link 362. Referring back to FIG. 3, left steering link 360 is pivotally connected at one end to turntable 340, and pivotally connected at its opposite end to steering frame 320. Right steering link 362 is pivotally connected at one end to turntable 340, and pivotally connected at its opposite end to steering frame 320.

By design, left steering link 360 and right steering link 362 have the same length. In one embodiment, the pivotal connections connecting left and right steering links 360 and 362 to turntable 340 and steering frame 320 are secured with eccentric connectors 364. The rotational position of eccentric connectors 364 is controllable to impart precise corrective adjustments to the length of left steering link 360 and right steering link 362 to ensure their close equality.

Steering frame 320 has a top side facing upwards, and a bottom side facing, and proximate to, front dolly 100. As best seen in FIG. 3, steering frame 320 has a left steering bracket 326 located on its left end (having a pivot point 382), and a right steering bracket 328 located on its right end (having a pivot point 380). In a one embodiment, left steering bracket 326 and right steering bracket 328 are proximate to the bottom side of steering frame 320, and thus beneath the horizontal center plane of steering frame 320. In another embodiment, left steering bracket 326 and right steering bracket 328 are relatively flexible.

Turntable 340 has a top side facing upwards, and a bottom side facing, and proximate to, rear dolly 200. As best seen in FIG. 3, turntable 340 has a left turntable bracket 346 located on its left end, and a right turntable bracket 348 located on its right end. In one embodiment, left turntable bracket 346 and right turntable bracket 348 are proximate to the bottom side of turntable 340, and thus beneath the horizontal center plane of turntable 340. In another embodiment, left turntable bracket 346 and right turntable bracket 348 are relatively flexible.

Referring back to FIG. 4, a pair of cradle brackets 370 is provided on the top side of turntable 340. Cradle brackets 370 permit pivotal connection of cradle 400 to the topside of turntable 340.

In the embodiment illustrated, a torque tube 310 is connected to steering frame 320 in non-rotating relation. A key 312 is attached to torque tube 310. Key 312 is designed for complimentary fit into keyway 136 on front dolly 100. When assembled, torque tube 310 will pass through the center of cylindrical opening 262 and through thrust bearing assembly 130. In one embodiment, a base plate 314 (see FIG. 6) is located inside torque tube 310 proximate to the engagement of key 312 with keyway 136 to prevent distortion of torque tube 310. A retainer 316 (see FIG. 7) can be secured to the bottom of torque tube 310. Retainer 316 prevents vertical movement of torque tube 310 relative to cylindrical opening 262 and rear dolly 200.

Figure 5:
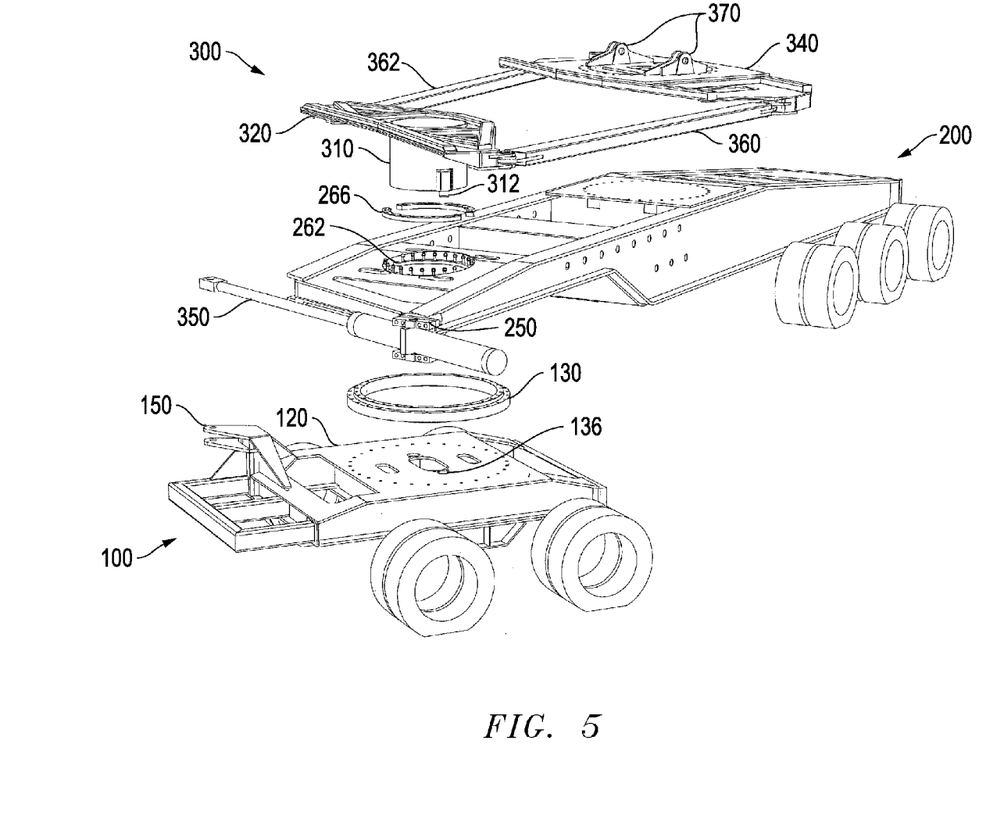
FIG. 5 is a partially exploded isometric view of an embodiment of the mechanically steered transport system of FIG. 3, and further illustrating the hydraulic steering assembly substantially assembled.

FIG. 5 is a partially exploded isometric view of mechanically steered transport system 10 of FIG. 3, illustrating steering assembly 300 substantially assembled above rear dolly 200, which is above front dolly 100. As illustrated in FIG. 5 and in FIG. 3, a bearing pad 264 may be located at cylindrical opening 262 for providing smooth rotational engagement between torque tube 310 and cylindrical opening 262. A bolting ring 266 may be used to secure bearing pad 264 in place.

Figure 6:
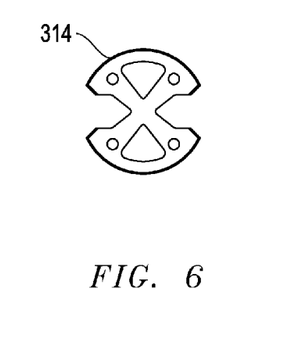
FIG. 6 is a top view of a base plate.

FIG. 6 is a top view of base plate 314. Base plate 314 can be located inside torque tube 310 to prevent buckling of torque tube 310.

Figure 7:
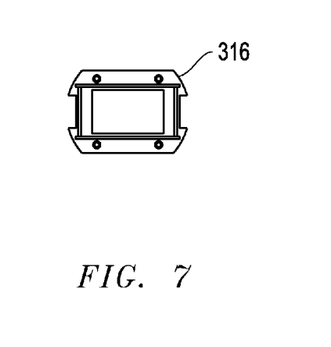
FIG. 7 is a top view of a retainer.

FIG. 7 is a top view of retainer 316. Retainer 316 can be secured to the bottom of torque tube 310. Retainer 316 prevents vertical movement or disengagement of torque tube 310 relative to cylindrical opening 262 and rear dolly 200.

Figure 8:
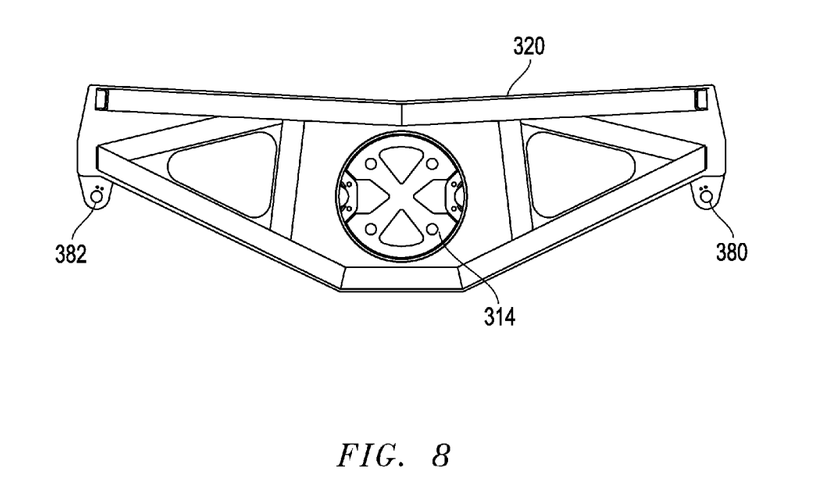
FIG. 8 is a top view of a steering frame connected to a torque tube having a base plate inside.

FIG. 8 is a top view of a steering frame connected to a torque tube having a base plate inside.

Figure 9:
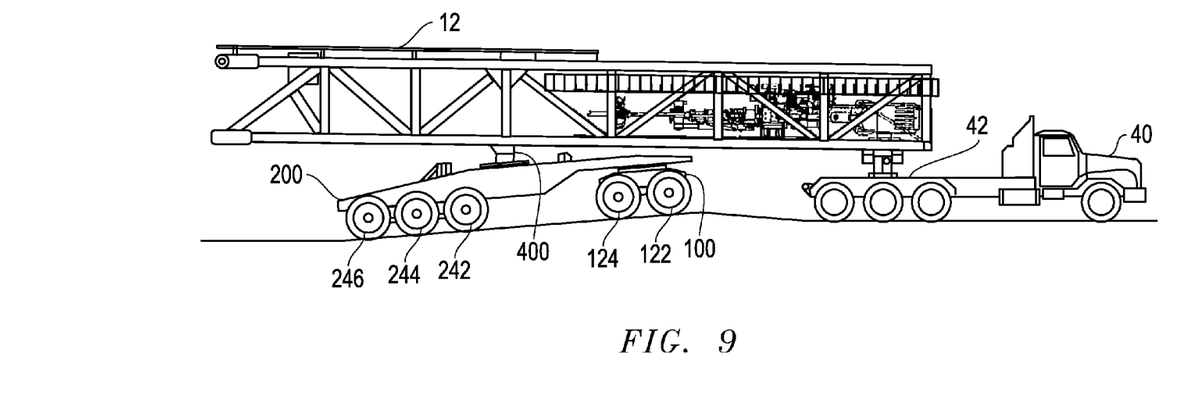
FIG. 9 is a side view of the transport system of the present invention, illustrating the assembly being pulled by a tractor, carrying a mast section of a drilling rig, and going over a raised portion of road.

FIG. 9 is a side view of transport system 10 being pulled by tractor 40, carrying structure 12 while going over a raised portion of road.

Figure 10:
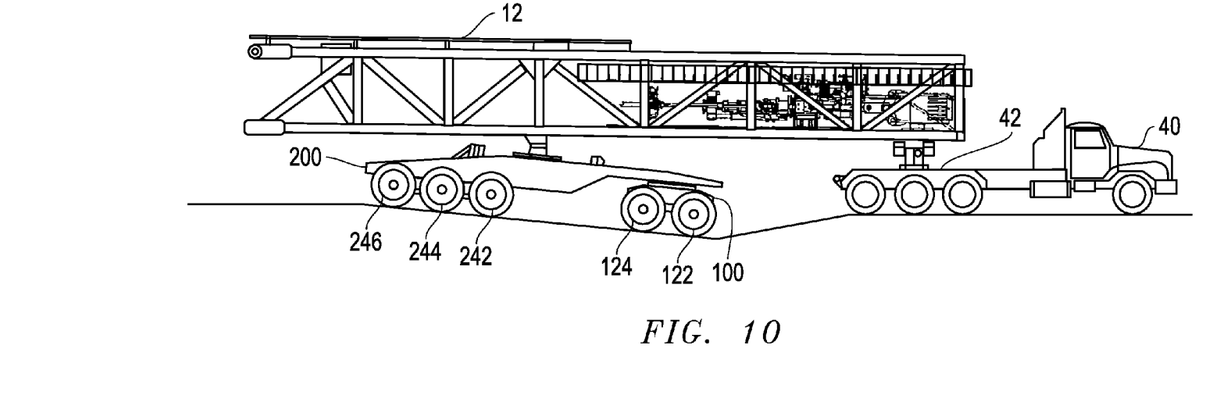
FIG. 10 is a side view of the transport system of FIG. 3, illustrating the assembly going over a low portion of road.

FIG. 10 is a side view of transport system 10, illustrating transport system 10 going over a low portion of road. As described above (referring to FIG. 4), cradle brackets 370 permit pivotal connection of cradle 400 to the topside of turntable 340. This allows structure 12 to remain connected to tractor load cradle 42 when tractor 40 is negotiating inclines and declines and uneven conditions in the road.

Operation

In the most general sense, structure 12 is pivotally connected to a tractor 40. The remaining weight of structure 12 is pivotally mounted to rear dolly 200. Rear dolly 200 is pivotally connected to front dolly 100, such that a portion of the weight of structure 12 is distributed between front and rear dollies 100 and 200, respectively.

Tractor 40 pulls on structure 12, which pulls rear dolly 200 beneath structure 12. Rear dolly 200 pushes front dolly 100 at the pivotal connection. When tractor 40 turns, structure 12 also turns. Structure 12 is connected to steering system 300 such that rotation of structure 12 steers front dolly 100 so that transport system 10 can follow tractor 40 around turns. What follows is a more detailed treatment of components and the specific relationships between components.

The front end of transported structure 12 is pivotally connected to a tractor 40 at a tractor load cradle 42. The remaining weight of structure 12 is distributed between front and rear dollies 100 and 200, respectively. Load cradle 400 is designed to support the remaining weight of structure 12. Tractor 40 pulls on structure 12, which pulls rear dolly 200 through the connection of load cradle 400 to turntable 340 and rear thrust bearing assembly 230.

Forward portion 260 of rear dolly 200 is pivotally connected to front platform 120 of front dolly 100 by front thrust bearing assembly 130. Rear dolly 200 pushes front dolly 100 forward through the connection at front thrust bearing assembly 130.

When tractor 40 turns, carried structure 12 (the transported load) rotates with tractor 40. Structure 12 is supported by load cradle 400 which is mounted to turntable 340. Turntable 340 is connected to rear dolly 200 through a rear thrust bearing assembly 230. This allows structure 12, load cradle 400, and turntable 340 to rotate independently of rear dolly 200.

Rotation of turntable 340 causes opposing directional movement of steering links 360 and 362 to rotate steering frame 320. When tractor 40 turns right, turntable 340 tensions (pulls on) right steering link 362 and compresses (pushes on) left steering link 360. When tractor 40 turns left, turntable 340 tensions (pulls on) left steering link 360 and compresses (pushes on) right steering link 362. The movement of left and right steering links 360 and 362 forces rotation of steering frame 320.

Torque tube 310 extends downwards from the bottom side of steering frame 320. Torque tube 310 has one or more keys 312 connected to it that engage keyway 136 such that torque tube 310 is locked in non-rotational relationship with front dolly 100. Rotation of steering frame 320 thus results in like rotation of torque tube 310, keys 312, and front dolly 100.

Since torque tube 310 passes through the center of cylindrical opening 262 and through front thrust bearing assembly 130, torque tube 310 is isolated from the pushing forces applied to front dolly 100 by rear dolly 200. Similarly, front thrust bearing assembly 130 is isolated from the steering forces being applied to front dolly 100 by steering system 300, other than as to experience and permit relative rotation of front dolly 100 and rear dolly 200.

In one embodiment, illustrated in FIG. 6 (see also FIG. 8), a base plate 314 is provided for location inside torque tube 310 proximate to the engagement of key 312 with keyway 136 to prevent distortion of torque tube 310. A retainer 316 can be secured to the bottom of torque tube 310. Retainer 316 prevents vertical movement of torque tube 310 relative to cylindrical opening 262 and rear dolly 200.

The length of turntable 340 is constrained by transport width 22 and by the limits placed on the rotated turntable 340 so it does not conflict with the chassis of the dolly. Using a wider turntable reduces the forces on the link.

As stated above, left steering link 360 and right steering link 362 have the same length. However, principal to the present invention, the width of steering frame 320 is less than the width of turntable 340. As a result, left steering link 360, right steering link 362, turntable 340, and steering frame 320 form an isosceles trapezoid when transport system 10 is traveling in a straight line.

Since the distance between the connections of left steering link 360 and right steering link 362 to turntable 340 is greater than the distance between the connections of left steering link 360 and right steering link 362 to steering frame 320, left steering link 360 is nonparallel in relationship to the right steering link 362. Turntable 340 and steering frame 320 form the parallel bases of the isosceles trapezoid. In the preferred embodiment, the ratio of the length of the bases (steering frame 320 to that of turntable 340) ranges between 0.77 and 0.85.

In one embodiment, left steering link 360 is pivotally connected between steering frame 320 and/or turntable 340 with eccentric connectors 364. The rotational position of eccentric connectors 364 is controllable to impart precise corrective adjustments to the total length of left steering link 360 and right steering link 362 to ensure their close equality.

In this embodiment, right steering link 362 is also pivotally connected between steering frame 320 and/or turntable 340 with an eccentric connector 364. Each eccentric connector 364 is rotatable to impart small adjustments to the distance between steering frame 320 and turntable 340 on each of the left and right sides.

In another embodiment, structure 12 to be transported is connected to a tractor 40. Structure 12 is mounted onto load cradle 400 of transport system 10 located behind tractor 40. Tractor 40 pulls structure 12, structure 12 pulls rear dolly 200, and rear dolly 200 pushes front dolly 100.

As described, a change in the direction of tractor 40 rotates structure 12. Rotation of structure 12 rotates turntable 340 in relation to rear dolly 200. Rotation of turntable 340 compresses one of left or right steering links 360 or 362 and tensions the other, so as to urge steering frame 320 to rotate front dolly 100 towards the new direction of tractor 40. The resistance to rotation of front dolly 100 causes torsional deflection of turntable 340 and steering frame 320 in an amount sufficient to correct for the lack of a rotatability of the quadrilateral steering system of transport system 10.

Transport system 10 has a left side and a right side in relationship to a forward direction of travel. The steering frame 320 has a top 322 (not shown) and an opposite bottom 324 (not shown) facing front platform 120. A left steering bracket 326 is attached to the bottom-left side of steering frame 320 (having a pivot point 382), and a right steering bracket 328 is attached to the bottom-right side of steering frame 320 (having a pivot point 380). Turntable 340 has a top 342 (not shown) and an opposite bottom 344 (not shown) facing rear platform 220. A left turntable bracket 346 is attached to the bottom-left side of turntable 340 (having a pivot point 386), and a right turntable bracket 348 is attached to the bottom-right side of turntable 340 (having a pivot point 384). Left steering link 360 is pivotally connected at a first end to left steering bracket 326 and pivotally connected at its opposite end to left turntable bracket 346. Right steering link 362 is pivotally connected at a first end to right steering bracket 328 and pivotally connected at an opposite end to right turntable bracket 348. The brackets 326, 328 flex under load as a result of their location offset below turntable 340 and the relatively flat cross-section of turntable 340 having relatively low torsional stiffness. This flexibility functions to absorb small variations in the unloaded pin to pivot geometry between the steering link pins and steering frame pivot centers.

It is important to be able to accurately locate rear dolly 200 when locating structure 12 at their designated delivery locations. For this purpose, as detailed above, a manual override may be provided. In this embodiment, front dolly cylinder bracket 150 is located on front dolly 100, preferably forward of thrust bearing. Rear dolly cylinder bracket 250 is located on forward portion 260 of rear dolly 200, preferably forward of torque tube 310. With actuator 350 pivotally connected between front dolly cylinder bracket 150 and rear dolly cylinder bracket 250, actuator 350 may be engaged for overriding the steering system 300 of transport system 10 when reversing the system, or when operating in small spaces, like parking lots or drilling rig sites.

Figure 11A:
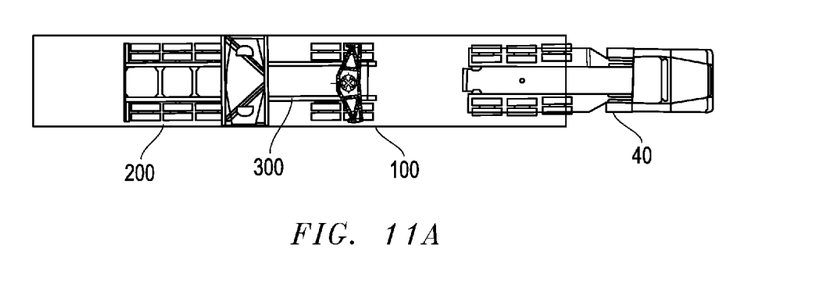
FIG. 11A is a top view of the transport system of the present invention, illustrating the transport system being pulled by a tractor, and driving in a straight path.
Figure 11B:
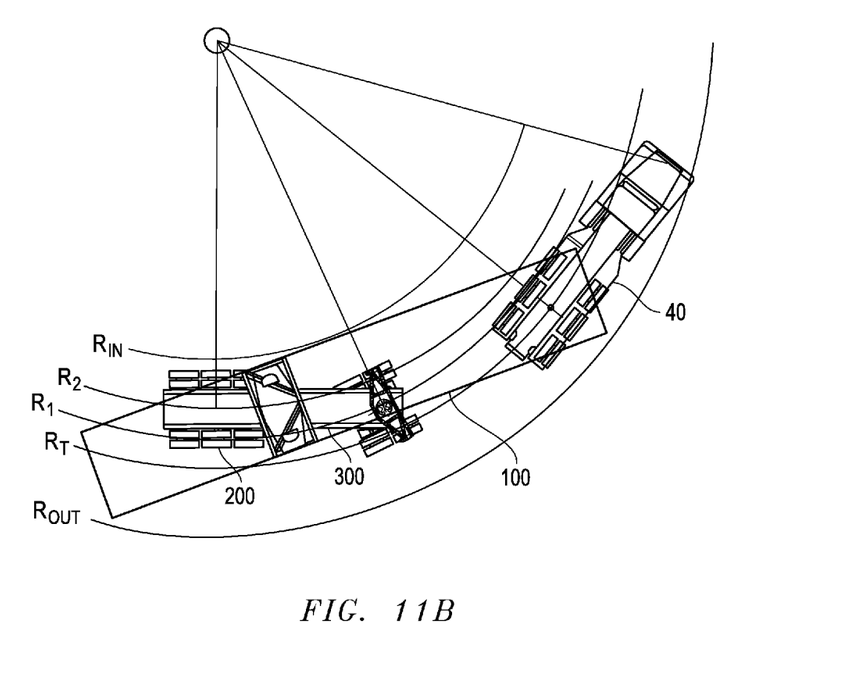
FIG. 11B illustrates the transport system of FIG. 11A being pulled by a tractor and engaging in a relatively tight left-hand turn.

FIG. 11A is a top view of transport system 10, illustrating transport system 10 being pulled by tractor 40 and driving in a straight path. FIG. 11B illustrates transport system 10 being pulled by tractor 40 and engaging in a left-hand turn.

Figure 12A:
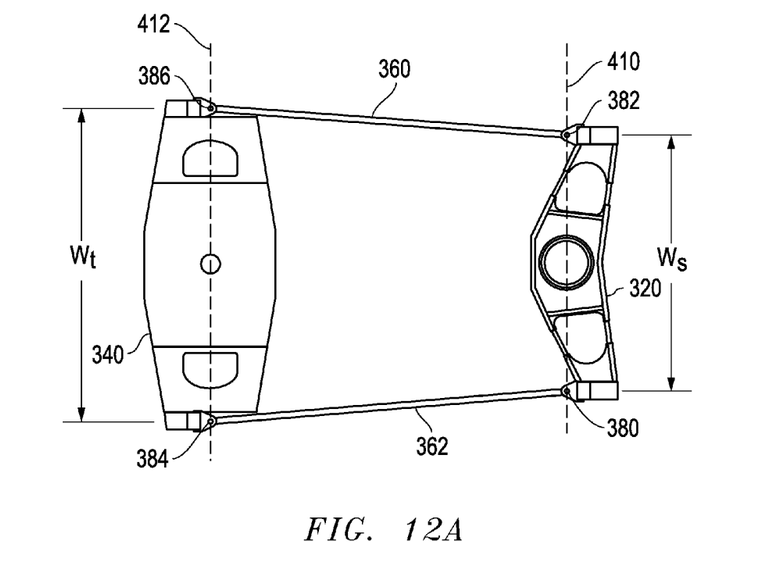
FIG. 12A is a top view of the basic components of the steering system of the transport system in FIG. 11A, in the orientation found while the transport system is being pulled by a tractor and driving in a straight path.
Figure 12B:
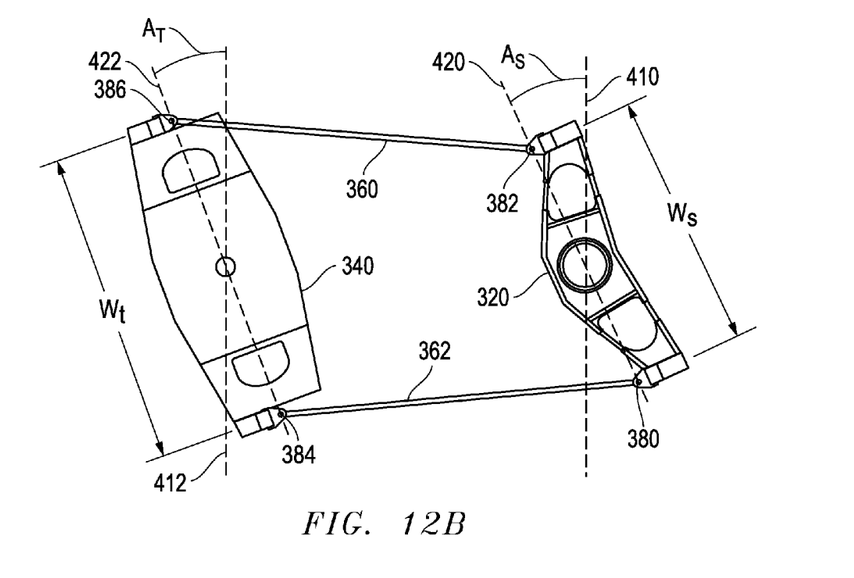
FIG. 12B is a top view of the basic components of the steering system of the transport system in FIG. 11B, in the orientation found while the transport system is being pulled by a tractor and engaging in a relatively tight left-hand turn.

FIG. 12A is a top view of the basic components of steering system 300 from FIG. 11A, illustrating the position of steering system 300 when transport system 10 is proceeding in a straight path. FIG. 12B is a top view of the basic components of steering system 300 from FIG. 11B, illustrating the position of steering system 300 when transport system 10 is engaging in a left-hand turn.

As seen in FIGS. 12A and 12B, steering frame 320 has a width $W_s$, representing the distance between a pivotal connection 380 to right steering link 362 and a pivotal connection 382 to left steering link 360. Turntable 340 has a width $W_t$, representing the distance between a pivotal connection 384 to right steering link 362 and a pivot connection 386 to left steering link 360. As illustrated, width $W_t$ of turntable 340 is larger than width $W_s$ of steering frame 320. Left steering link 360 and right steering link 362 are the same length, within a reasonable tolerance.

Referring to FIG. 12A, a steering centerline 410 is shown passing through pivots 380 and 382. As illustrated in FIG. 12A, steering frame centerline 410 is perpendicular to the direction of travel when transport system 10 is traveling in a straight line. A turntable centerline 412 is shown passing through pivots 384 and 386. As illustrated in FIG. 12A, turntable centerline 412 is perpendicular to the direction of travel when transport system 10 is traveling in a straight line. Also, when transport system 10 is traveling in a straight path, steering frame centerline 410 and turntable centerline 412 are substantially parallel.

As a result of the parallelism of steering frame 320 and turntable 340, combined with the difference in $W_s$ and $W_t$, combined with the steering links 360 and 362 having substantially the same length, the primary components of steering system 300 form an isosceles trapezoid when steering transport system 10 in a straight direction.

Referring to FIG. 11B, transport system 10 is being pulled by tractor 40 and engaging in a left-hand turn. As seen in FIG. 11B, tractor 40 turns in a path having a radius $R_T$. Steering system 300 directs front dolly 100 in a path having a radius $R_1$. Rear dolly 200 follows tractor 40 in a path having a radius $R_2$. As seen in FIG. 11B, $R_T$ is greater than $R_1$, and $R_1$ is greater than $R_2$. The length of path $R_1$ relative to path $R_T$, and the length of path $R_2$ relative to $R_1$, are determined by the geometry and mechanics of steering system 300.

FIG. 12B is a top view of steering system 300 from FIG. 11B, illustrating the position of steering system 300 when transport system 10 is engaging in a left-hand turn. A second steering centerline 420 is shown passing through pivots 380 and 382. Similarly, a second turntable centerline 422 is shown passing through pivots 384 and 386. A steering frame angle $A_S$ is formed between centerlines 410 and 420, representing the angle of rotation of steering frame 320 which results from engaging in the left turn illustrated in FIG. 11B. A turntable angle $A_T$ is formed between centerlines 412 and 422, representing the angle of rotation of turntable 340 which results from engaging in the left turn illustrated in FIG. 11B. Fundamental to the present invention is that $A_S$ is greater than $A_T$.

The length of front dolly path $R_1$ relative to rear dolly path $R_2$ are critical to safe and efficient movement of transport system 10. The length of front dolly path $R_1$ relative to rear dolly path $R_2$ is determined by the difference between steering frame angle $A_S$ and turntable angle $A_T$. Steering frame angle $A_S$ will be larger than turntable angle $A_T$. In one example, front dolly 100 engages in a 25° turn (steering frame angle $A_S$=25° while rear dolly 200 engages in a 20.13° turn (turntable angle $A_T$=20.13°). Steering frame angle $A_S$ and turntable angle $A_T$ are determined by the precise geometry of the primary components of steering assembly 300. In particular, in an embodiment in which front dolly 100 has 2 axels, and rear dolly 200 has three axles, the preferred ratio of $W_s$ to $W_t$ is between 0.77 and 0.85. In a more preferred embodiment, the preferred ratio of $W_s$ to $W_t$ is between 0.79 and 0.83. These ratios have been demonstrated to operate very well with transport system 10.

Figure 13:
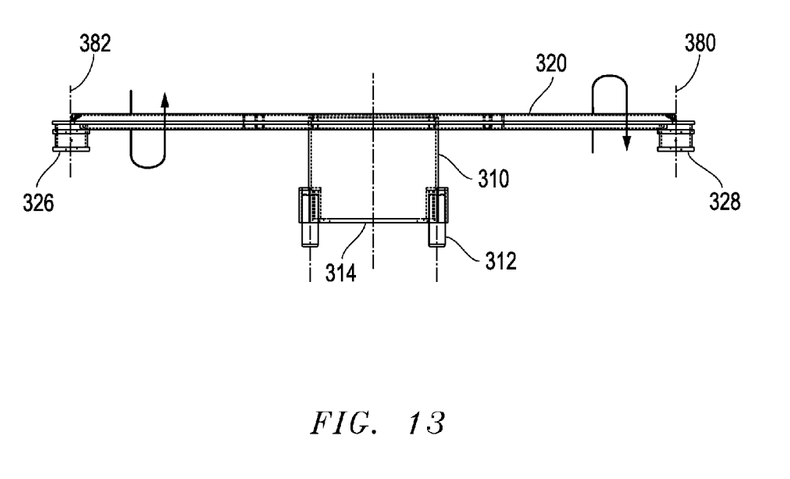
FIG. 13 is a front end view of the steering frame of FIG. 8, illustrating the direction of distortion of the steering frame that results from the forces imparted during a left turn.

FIG. 13 is a front-end view of steering frame 320, with the arrows illustrating the direction of distortion generated by the forces acting on steering frame 320 during the left turn of FIGS. 11B and 12B. Turntable 340 is likewise distorted.

During a left turn, steering frame 320 at bracket 326 is placed in compression, and steering frame 320 at bracket 328 is placed in tension. Bracket 326 is twisted in one rotational direction about steering frame 320, and bracket 328 is twisted in the opposite direction of rotation about steering frame 320. Similarly, bracket 346 is twisted in one rotational direction about turntable 340, and bracket 348 is twisted in the opposite direction of rotation about turntable 340.

The designed elasticity of steering frame 320 and turntable 340 to permit distortion under steering loads allows for the functionality of the non-parallelogram steering system 300 of transport system 10. Specifically, the designed distortion provides a correction to the relative length of the left and right sides of steering assembly 300.

The invention claimed is:

1. A large structure load transport system comprising:
a front dolly having at least one axle;
a rear dolly having at least two axles; and,
a steering mechanism comprising:
    a steering frame non-rotatably connected to the front dolly;
    a turntable pivotally mounted to the rear dolly;
    a left steering link, pivotally connected between the steering frame and the turntable;
    a right steering link, pivotally connected between the steering frame and the turntable; and,
    the distance between the connections of the left steering link and the right steering link to the turntable being greater than the distance between connections of the left steering link and the right steering link to the steering frame.

2. The transport system according to claim 1, further comprising:
the left steering link being nonparallel in relationship to the right steering link.

3. The transport system according to claim 1, further comprising:
the left steering link, the right steering link, the turntable, and the steering frame forming an isosceles trapezoid when the transport system is traveling in a straight line; and,
the turntable and the steering frame forming the parallel bases of the isosceles trapezoid.

4. The transport system according to claim 3, further comprising:
the ratio of the length of the bases of the trapezoid ranging between 0.77 and 0.85.

5. The transport system according to claim 3, further comprising:
the ratio of the length of the bases of the trapezoid ranging between 0.79 and 0.83.

6. The transport system according to claim 1, further comprising:
the left steering link, pivotally connected between the steering frame and the turntable with an eccentric connector;
the right steering link, pivotally connected between the steering frame and the turntable with an eccentric connector; and,
each eccentric connector being rotatable to impart small adjustments to the distance between the steering frame and the turntable on each of the left and right sides.

7. The transport system according to claim 1, further comprising:
a structure to be transported is connected to a tractor;
the structure mounted onto a load cradle of the transport system located behind the tractor; and,
wherein the tractor pulls the structure, the structure pulls the rear dolly, and the rear dolly pushes the front dolly.

8. The transport system according to claim 7, further comprising:
a change in the direction of the tractor rotates the structure;
rotation of the structure rotates the turntable in relation to the rear dolly; and,
rotation of the turntable compresses one of the right or left steering links and tensions the other so as to urge the steering frame to rotate the front dolly towards the new direction of the tractor.

9. The transport system according to claim 1, further comprising:
- the transport system having a left side and a right side in relationship to a forward direction of travel;
- the steering frame having a top and an opposite bottom facing the front dolly;
- a right steering bracket attached to the bottom and right side of the steering frame;
- a left steering bracket attached to the bottom and left side of the steering frame;
- the turntable having a top and an opposite bottom facing the rear dolly;
- a right turntable bracket attached to the bottom and right side of the turntable;
- a left turntable bracket attached to the bottom and left side of the turntable;
- the right steering link being pivotally connected at a first end to the right steering bracket and pivotally connected at its opposite end to the right turntable bracket; and,
- the left steering link being pivotally connected at a first end to the left steering bracket and pivotally connected at an opposite end to the left turntable bracket.

10. The transport system according to claim 9, further comprising:
- the right and left steering brackets being flexible to allow for variations between the steering bracket connections and the turntable connections.

11. The transport system according to claim 9, further comprising:
- the right and left turntable brackets being flexible to allow for variations between the steering bracket connections and the turntable connections.

12. The transport system according to claim 1, further comprising:
- a front thrust bearing assembly located between the front dolly and a forward portion of the rear dolly.

13. The transport system according to claim 12, further comprising:
- the front thrust bearing assembly having a hollow interior; and,
- a torque tube positioned in non-rotatable relation inside the hollow interior of the front thrust bearing assembly.

14. The transport system according to claim 13, further comprising:
- the torque tube having a hollow interior; and,
- a base plate located inside the hollow interior of the torque tube.

15. The transport system according to claim 13, further comprising:
- the torque tube having a hollow interior;
- a base plate positioned inside the hollow interior of the torque tube; and,
- a retainer connected to restrain the torque tube from disengagement from the front dolly.

16. The transport system according to claim 1, further comprising:
- a rear thrust bearing assembly located between the rear dolly and the turntable.

17. The transport system according to claim 1, further comprising:
- a front dolly cylinder bracket located on the front dolly;
- a rear dolly cylinder bracket located on the forward portion of the rear dolly; and,
- an actuator pivotally connected between the front dolly cylinder bracket of the front dolly and the rear dolly cylinder bracket of the rear dolly.

18. The transport system according to claim 17, further comprising:
- the actuator being a hydraulic cylinder; and,
- a tank having sufficient capacity to retain the majority of the hydraulic cylinder fluid when the cylinder is unpowered during normal driving conditions.

19. A large structure load transport system comprising:
- a front dolly comprising:
  - a front platform; and,
  - exactly two axles connected to the front platform;
- a rear dolly comprising:
  - a rear platform;
  - a rearward portion located behind the rear platform;
  - exactly three axles connected to the rearward portion;
  - a forward portion located forward of the rear platform;
  - the forward portion being pivotally connected to the front dolly; and,
- a steering mechanism comprising:
  - a steering frame non-rotatably connected to the front dolly;
  - a turntable pivotally mounted to the rear platform;
  - a load cradle connectable above the turntable for securely supporting the structure to be transported;
  - a left steering link, pivotally connected between the steering frame and the turntable;
  - a right steering link, pivotally connected between the steering frame and the turntable; and,
  - the distance between the connections of the left steering link and right steering link to the turntable being greater than the distance between connections of the left steering link and right steering link to the steering frame.

* * * * *